(12) United States Patent
Boothby

(10) Patent No.: US 7,302,446 B1
(45) Date of Patent: *Nov. 27, 2007

(54) SYNCHRONIZING DATABASES

(75) Inventor: David J. Boothby, Nashua, NH (US)

(73) Assignee: Intellisync Corporation, San Jose, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 10/945,486

(22) Filed: Sep. 20, 2004

Related U.S. Application Data

(63) Continuation of application No. 10/122,704, filed on Apr. 11, 2002, now Pat. No. 6,799,190, which is a continuation of application No. 09/169,199, filed on Oct. 9, 1998, now Pat. No. 6,405,218, which is a continuation-in-part of application No. 08/752,490, filed on Nov. 13, 1996, now Pat. No. 5,943,676.

(51) Int. Cl.
*G06F 17/30* (2006.01)
(52) U.S. Cl. .................................... 707/102
(58) Field of Classification Search ............. 707/1–10, 707/100–104.1, 200–206, 102
See application file for complete search history.

(56) References Cited

U.S. PATENT DOCUMENTS

| | | |
|---|---|---|
| 4,162,610 A | 7/1979 | Levine |
| 4,432,057 A | 2/1984 | Daniell et al. ............ 395/608 |
| 4,807,154 A | 2/1989 | Scully et al. |
| 4,807,155 A | 2/1989 | Cree et al. |
| 4,807,182 A | 2/1989 | Queen ..................... 395/144 |
| 4,817,018 A | 3/1989 | Cree et al. |
| 4,819,156 A | 4/1989 | DeLorme et al. ....... 395/182.13 |
| 4,819,191 A | 4/1989 | Scully et al. |
| 4,827,423 A | 5/1989 | Beasley et al. ............. 364/468 |
| 4,831,552 A | 5/1989 | Scully et al. |
| 4,866,611 A | 9/1989 | Cree et al. ................. 395/600 |

(Continued)

OTHER PUBLICATIONS

IEEE publication entitled, Design and Analysis of Communication Network for Distributed SCADA System by Qian Wang et al., vol. 3, pp. 2062-2065, Jan. 2000.

(Continued)

*Primary Examiner*—Diane D Mizrahi
(74) *Attorney, Agent, or Firm*—Alston & Bird LLP

(57) ABSTRACT

A computer program and a computer implemented method are provided for synchronizing two databases by attempting to identify a plurality of records of the second database storing a span of information stored in a record of the first database and synchronizing the first database and the second database based on the results of the attempt. The computer program and a computer implemented can also store a record of a first database in a second database where the record of the first database stores a span of information and the second database is not capable of storing such span of information in a single record. To do so, a plurality of records of the second database are generated to store the span of information of the record of the first database, each of the plurality of the records of the second database storing a portion of the span of the information, where the plurality of records of the second database in combination store a selected segment of the span of information less than the entirety of the span of information.

1 Claim, 8 Drawing Sheets

200. For Each record in History File
201. Load record
202. Store record in Workspace
203. Next record

U.S. PATENT DOCUMENTS

| | | | |
|---|---|---|---|
| 4,875,159 A | 10/1989 | Cary et al. | 395/619 |
| 4,939,689 A | 7/1990 | Davis et al. | |
| 4,956,809 A | 9/1990 | George et al. | 395/601 |
| 4,980,844 A | 12/1990 | Demjanenko et al. | 364/550 |
| 5,065,360 A | 11/1991 | Kelly | 395/800 |
| 5,124,912 A | 6/1992 | Hotaling et al. | |
| 5,134,564 A | 7/1992 | Dunn et al. | |
| 5,136,707 A | 8/1992 | Block et al. | 395/600 |
| 5,142,619 A | 8/1992 | Webster, III | 395/161 |
| 5,155,850 A | 10/1992 | Janis et al. | 395/600 |
| 5,170,480 A | 12/1992 | Mohan et al. | 395/600 |
| 5,187,787 A | 2/1993 | Skeen et al. | 395/600 |
| 5,197,000 A | 3/1993 | Vincent | |
| 5,201,010 A | 4/1993 | Deaton et al. | |
| 5,204,958 A | 4/1993 | Cheng et al. | |
| 5,210,868 A | 5/1993 | Shimada et al. | 395/615 |
| 5,220,540 A | 6/1993 | Nishida et al. | |
| 5,228,116 A | 7/1993 | Harris et al. | 395/54 |
| 5,237,678 A | 8/1993 | Kuechler et al. | 395/600 |
| 5,251,151 A | 10/1993 | Demjanenko et al. | 364/550 |
| 5,251,291 A | 10/1993 | Malcolm | 395/161 |
| 5,261,045 A | 11/1993 | Scully et al. | 395/161 |
| 5,261,094 A | 11/1993 | Everson et al. | 395/617 |
| 5,272,628 A | 12/1993 | Koss | 364/419.19 |
| 5,276,876 A | 1/1994 | Coleman et al. | |
| 5,278,978 A | 1/1994 | Demers et al. | 395/600 |
| 5,278,982 A | 1/1994 | Daniels et al. | 395/600 |
| 5,283,887 A | 2/1994 | Zachery | 395/500 |
| 5,293,627 A | 3/1994 | Kato et al. | 395/550 |
| 5,301,313 A | 4/1994 | Terada et al. | 395/600 |
| 5,315,709 A | 5/1994 | Alston, Jr. et al. | 395/606 |
| 5,323,314 A | 6/1994 | Baber et al. | |
| 5,327,555 A | 7/1994 | Anderson | 395/617 |
| 5,333,252 A | 7/1994 | Brewer, III et al. | 395/767 |
| 5,333,265 A | 7/1994 | Orimo et al. | 395/200 |
| 5,333,316 A | 7/1994 | Champagne et al. | 395/600 |
| 5,339,392 A | 8/1994 | Risberg et al. | 395/161 |
| 5,339,434 A | 8/1994 | Rusis | 395/700 |
| 5,355,476 A | 10/1994 | Fukumura | 395/600 |
| 5,375,234 A | 12/1994 | Davidson et al. | 395/600 |
| 5,392,390 A | 2/1995 | Crozier | 395/335 |
| 5,396,612 A | 3/1995 | Huh et al. | 395/575 |
| 5,412,801 A | 5/1995 | De Remer et al. | 714/20 |
| 5,421,012 A | 5/1995 | Khoyi et al. | |
| 5,434,994 A | 7/1995 | Shaheen et al. | 395/617 |
| 5,444,851 A | 8/1995 | Woest | 395/200.1 |
| 5,455,945 A | 10/1995 | VanderDrift | |
| 5,463,735 A | 10/1995 | Pascucci et al. | 394/200.1 |
| 5,475,833 A | 12/1995 | Dauerer et al. | 395/617 |
| 5,511,188 A | 4/1996 | Pascucci et al. | 395/600 |
| 5,519,606 A | 5/1996 | Frid-Nielsen et al. | 395/228 |
| 5,530,853 A | 6/1996 | Schell et al. | |
| 5,530,861 A | 6/1996 | Diamant et al. | |
| 5,530,939 A | 6/1996 | Mansfield, Jr. et al. | |
| 5,557,518 A | 9/1996 | Rosen | |
| 5,560,005 A | 9/1996 | Hoover et al. | 395/600 |
| 5,568,402 A | 10/1996 | Gray et al. | 364/514 C |
| 5,581,753 A | 12/1996 | Terry et al. | |
| 5,581,754 A | 12/1996 | Terry et al. | |
| 5,583,793 A | 12/1996 | Gray et al. | 364/514 C |
| 5,596,574 A | 1/1997 | Perlman et al. | 370/389 |
| 5,600,834 A | 2/1997 | Howard | 395/617 |
| 5,608,865 A | 3/1997 | Midgely et al. | |
| 5,613,113 A | 3/1997 | Goldring | 395/618 |
| 5,615,109 A | 3/1997 | Eder | |
| 5,615,364 A | 3/1997 | Marks | 395/618 |
| 5,619,689 A | 4/1997 | Kelly | 395/617 |
| 5,623,540 A | 4/1997 | Morrison et al. | |
| 5,630,081 A | 5/1997 | Rybicki et al. | 395/948 |
| 5,649,182 A | 7/1997 | Reitz | |
| 5,649,195 A | 7/1997 | Scott et al. | |
| 5,659,741 A | 8/1997 | Eberhardt | |
| 5,666,530 A | 9/1997 | Clark et al. | 395/617 |
| 5,666,553 A | 9/1997 | Crozier | 395/803 |
| 5,671,407 A | 9/1997 | Demers et al. | |
| 5,682,524 A | 10/1997 | Freund et al. | 395/605 |
| 5,684,984 A | 11/1997 | Jones et al. | 395/610 |
| 5,684,990 A | 11/1997 | Boothby | 395/619 |
| 5,689,706 A | 11/1997 | Rao et al. | 395/617 |
| 5,701,423 A | 12/1997 | Crozier | 395/333 |
| 5,704,029 A | 12/1997 | Wright, Jr. | |
| 5,706,452 A | 1/1998 | Ivanov | |
| 5,706,509 A | 1/1998 | Man Hak Tso | |
| 5,708,812 A | 1/1998 | Van Dyke et al. | 395/712 |
| 5,708,840 A | 1/1998 | Kikinis et al. | 395/800 |
| 5,710,922 A | 1/1998 | Alley et al. | 395/617 |
| 5,727,202 A | 3/1998 | Kucala | 395/610 |
| 5,729,735 A | 3/1998 | Meyering | 395/610 |
| 5,737,539 A | 4/1998 | Edelson et al. | |
| 5,745,712 A | 4/1998 | Turpin et al. | 395/333 |
| 5,758,083 A | 5/1998 | Singh et al. | 395/200.53 |
| 5,758,150 A | 5/1998 | Bell et al. | 395/610 |
| 5,758,337 A | 5/1998 | Hammond | |
| 5,758,355 A | 5/1998 | Buchanan | 707/201 |
| 5,778,388 A | 7/1998 | Kawamura et al. | 707/203 |
| 5,781,908 A | 7/1998 | Williams et al. | 707/104 |
| 5,790,789 A | 8/1998 | Suarez | 395/200.32 |
| 5,790,974 A | 8/1998 | Tognazzini | |
| 5,799,072 A | 8/1998 | Vulcan et al. | |
| 5,809,494 A | 9/1998 | Nguyen | |
| 5,813,009 A | 9/1998 | Johnson et al. | |
| 5,813,013 A | 9/1998 | Shakib et al. | |
| 5,819,272 A | 10/1998 | Benson | |
| 5,819,274 A | 10/1998 | Jackson, Jr. | |
| 5,832,218 A | 11/1998 | Gibbs et al. | |
| 5,832,489 A | 11/1998 | Kucala | 707/10 |
| 5,838,923 A | 11/1998 | Lee et al. | 395/200.66 |
| 5,845,293 A | 12/1998 | Veghte et al. | 707/202 |
| 5,857,201 A | 1/1999 | Wright, Jr. et al. | |
| 5,870,759 A | 2/1999 | Bauer et al. | 707/201 |
| 5,870,765 A | 2/1999 | Bauer et al. | 707/203 |
| 5,875,242 A | 2/1999 | Glaser et al. | |
| 5,877,760 A | 3/1999 | Onda et al. | |
| 5,878,415 A | 3/1999 | Olds | |
| 5,884,323 A | 3/1999 | Hawkins et al. | 707/201 |
| 5,884,324 A | 3/1999 | Cheng et al. | 707/201 |
| 5,884,325 A | 3/1999 | Bauer et al. | 707/201 |
| 5,892,909 A | 4/1999 | Grasso et al. | |
| 5,897,640 A | 4/1999 | Veghte et al. | 707/202 |
| 5,924,094 A | 7/1999 | Sutter | |
| 5,926,816 A | 7/1999 | Bauer et al. | |
| 5,926,824 A | 7/1999 | Hashimoto | 707/520 |
| 5,928,329 A | 7/1999 | Clark et al. | 709/227 |
| 5,943,676 A | 8/1999 | Boothby | |
| 5,956,508 A | 9/1999 | Johnson et al. | |
| 5,966,714 A | 10/1999 | Huang et al. | |
| 5,970,502 A | 10/1999 | Salkewicz et al. | |
| 5,974,238 A | 10/1999 | Chase, Jr. | |
| 5,978,813 A | 11/1999 | Foltz et al. | |
| 5,995,980 A | 11/1999 | Olson et al. | |
| 5,999,947 A | 12/1999 | Zollinger et al. | 707/203 |
| 6,044,381 A | 3/2000 | Boothby et al. | |
| 6,081,806 A | 6/2000 | Chang et al. | 707/8 |
| 6,098,078 A | 8/2000 | Gehani et al. | |
| 6,125,369 A | 9/2000 | Wu et al. | 707/201 |
| 6,141,664 A | 10/2000 | Boothby | 707/201 |
| 6,212,221 B1 | 4/2001 | Wakayama et al. | |
| 6,233,452 B1 | 5/2001 | Nishino | |
| 6,272,074 B1 | 8/2001 | Winner | |
| 6,321,236 B1 | 11/2001 | Zollinger et al. | |
| 6,330,568 B1 | 12/2001 | Boothby | |
| 6,449,640 B1 | 9/2002 | Haverstock et al. | |
| 6,678,715 B1 | 1/2004 | Ando | |
| 6,925,477 B1 * | 8/2005 | Champagne et al. | 707/203 |

| | | | |
|---|---|---|---|
| 7,007,003 B1 * | 2/2006 | Rybicki | 707/1 |
| 2002/0156798 A1 | 10/2002 | Larue et al. | |

OTHER PUBLICATIONS

Yanyong Zhang Sivasubramaniam, A. Moreira, J. Franke, H. discloses an impact of workload and system parameters on next generation cluster scheduling mechanisms; Dept. of Comput. Sci. & Eng., Pennsylvania State Univ., University Park, PA,; Parallel and Dis.
Salzberg, B.; Time stamping after commit; Parallel and Distributed Information Systems, 1994., Proceedings of the Third International Conference, Sep. 1994 pp. 160-167.
Lomet, D.; Using timestamping to optimize two phase commit; Parallel and Distributed Information Systems, 1993., Proceeding of the Second; International Conference , Jan. 20-22, 1993: pp. 48-55.
Quaglia, F. and Cortellessa, V. discloses grain sensitive event scheduling in time warp parallel discrete event simulation; Parallel and Distributed Simulation, 2000. PADS 2000. Proceedings. Fourteenth; Workshop 2000; pp. 173-18.
Zhang et al. discloses impact of workload and system parameters on next generation cluster scheduling mechanisms, 2001, IEEE, pp. 967-985.
U.S. Appl. No. 08/927,922, filed Sep. 11, 1997.
U.S. Appl. No. 08/964,751, filed Nov. 5, 1997.
U.S. Appl. No. 09/036,400, filed Mar. 5, 1998.
U.S. Appl. No. 09/052,769, filed Mar. 31, 1998.
Alfieri, "The Best of WordPerfect Version 5.0," Hayden Books, pp. 153-165, 429-433 (1988).
"Automatically Synchronized Objects," Research Disclosure #29261, p. 614 (Aug. 1988).
Chapura, Inc., *PilotMirror Features Page*, http://www.chapura.com/features.html (1997).
Cobb et al., "Paradox 3.5 Handbook 3rd Edition," Bantom, pp. 803-816 (1991).
Chapura, Inc., *3 Compare*, http://www.chapura.com/3compare.html (1997).
"FRx Extends Reporting Power of Platinum Series: (IBM Desktop Software's Line of Accounting Software)," Doug Dayton, PC Week, v. 8, n. 5, p. 29(2) (Feb. 4, 1991).
IntellILink Brochure (1990).
"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).
"Open Netwrok Computing—Technical Overview," Sun Technical Report, Microsystems, Inc., pp. 1-32 (1997).
Organizer Link II Operation Manual, Sharp Electronics Corporation.
"The Big Picture (Accessing Information on Remote Data Management System," UNIX Review, v. 7, n. 8, p. 38(7) (August 1989).
User Manual for Connectivity Pack for the HP 95LX, Hewlett Packard Company (1991).
User Manual for PC-Link for the B.O.S.S. and the PC-Link for the B.O.S.S., Traveling Software, Inc. (1989).
Zahn et al., *Network Computing Architecture*, pp. 1-11; 19-31; 87-115; 117-133; 187-199; 201-209 (1990).
U.S. Appl. No. 08/749,926, filed Nov. 13, 1996.
U.S. Appl. No. 08/752,490, filed Nov. 13, 1996.
U.S. Appl. No. 08/748,645, filed Nov. 13, 1996.
Informix Guide to SQL Tutorial Version 7.1, Dec. 1994.
Oracle 7 Distributed Database Technology and Symmetric Replication, Oracle White Paper, Apr. 1995.
Oracle 7 Server Distributed Systems, vol. II: Replicated Data, Release 7.3, Feb. 1996.
Oracle 7™ Server SQL Manual Release 7.3, Feb. 1996.
IntelliLink for Windows User's Guide, Version 3.0, IntelliLink Corporation (1993).
Database Subsetting Tool: Introduction to DST and DST Designer's Guide, Syware, Inc. (1993).
Sarin, "Robust Application Design in Highly Available Distributed Databases," Proc. 5th Symp. Reliability in Distributed Software and Database Systems, pp. 87-94 (Jan. 13-15, 1986, Los Angeles).
Distributed Management of Replicated Data: Final Report, Computer Corporation of America (Oct. 9, 1984).
Sarin et al., "Overview of SHARD: A System for Highly Available Replicated Data", Computer Corporation of America (Apr. 8, 1988).
SRI Int'l, Network Reconstitution Protocol, RADC-TR-87-38, Final Technical Report (Jun. 1987).
Danberg, "A Database Subsetting Tool" (patent application) (Apr. 12, 1993).
Lamb et al., "The Objectstore Database System," Communications of the ACM, vol. 34, No. 10, pp. 50-63 (Oct. 1991).
TT Interchange, Time Technology, AVG Sales & Marketing Ltd. (1995).
Goldberg et al., "Using Collaborative Filtering to Weave an Information Tapestry," Communication of the ACM, vol. 35, No. 12, pp. 61-70 (Dec. 1992).
Now Up-to-Date Version 2.0 User's Guide, Now Software, Inc. (1992).
An Introduction to DataProgator Relational Version 1, IBM Corporation (1993).
Data Propagator Relational Guide Release 1, IBM Corporation (May 1994).
DataPropagator Relational Guide Release 2, IBM Corporation (Dec. 1994).
DataPropagator NonRelational MVS/ESA Version 2 Utilities Guide, IBM Corporation (Jul. 1994).
DPROPR Planning and Design Guide, IBM Corporation (Nov. 1996).
DataPropagator Relational Capture and Apply/400 Version 3, IBM Corporation (Jun. 1996).
DataPropagator Relational Capture and Apply for OS/400 Version 3, IBM Corporation (Nov. 1996).
Newton Connection Utilities User's Manual for the Macintosh Operating System, Apple Computer, Inc. (1996).
Newton Connection Utilities User's Manual for Windows, Apple Computer, Inc.
Newton Connection Utilities User's Manual for Macintosh, Apple Computer, Inc.
Newton Backup Utility User's Guide for the Windows Operating System, Apple Computer, Inc. (1995).
Newton Backup Utility User's Guide for the Macintosh Operating System, Apple Computer, Inc. (1995).
Newton Utilities User Manual, Apple Computer, Inc. (1995).
FileMaker Pro Server Administrator's Guide, Claris Corporation (1994).
Connectivity Pack User's Guide for the HP 200LX and the HP 100LX, Hewlett Packard.
Lotus cc:Mail Release 2, Lotus Development Corporation (1991-1993).
User's Guide Lotus Organizer Release 1.0, Lotus Development Corporation (1992).
FileMaker Pro User's Guide, Claris Corporation (1990, 1992).
Poesio et al., "Metric Constraints for Maintaining Appointments: Dates and Repeated Activities".
Slater, "Newton's Legacy; 3COM and Microsoft Battle for Market Share; Apple Newton, 3Com Palm III, Microsoft Palm-size PC peronal digital assistants; Product Information", Information Access Company (1998).
Negrino, "ACT 2.5.1, ACT for Newton 1.0", UMI, Inc. (1996).
Zilber, "Toy story; personal digital assistants; Product Information", Information Access Company (1996).
Wingfield, "Desktop to Newton connectivity", UMI, Inc. (1996).
"Now Software Announces Updated Synchronization Software for Newton 2.0 Devices; Now Synchronize Simultaneously Updates MessagePad, Now Up-to Date & Contact", Business Wire, Inc. (1995).
"Claris Ships FileMaker Pro 3.0 for Macintosh and Windows", Business Wire, Inc. (1995).
Alsop, "Distributed Thinking; Realizing the gravity of its PDA problems, Apple has drawn me back to Newton", InfoWorld Media Group (1995).

Rubin, "Now Software stays in sync; Now Synchronize file synchronization software for Macs and Newton PDAs; Software Review; EvaluationBrief Article", Information Access Company (1995).

"Now Calendar/Scheduler/Contact Mgr for Mac Update", Post-Newsweek Business Information Inc. (1995).

Staten, "csInStep middleware lets Newton talk to PIMS; Concierge Software LC's csInStep; Brief Article; Product Announcement; Brief Article", Information Access Company (1995).

Baum, "Designing Moble applications; A new approach needed for on-the-road systems", InfoWorld Media Group (1994).

Parkinson, "Remote users get in sync with office files; News Analysis", Information Access Company (1994).

Adly, "HARP: A Hierarchical Asynchronous Replication Protocal for Massively Replicated Systems," Computer Laboratory, Cambridge University, United Kingdom (undated).

Adly et al., "A Hierarchical Asynchronous Replication Protocal for Large Scale Systems," Computer Laboratory, Cambridge University, United Kingdom, Computer Science Department, Alexandria University, Egypt (undated).

Alexander, "Designed, sold, delivered, serviced," Computerworld Client/Server Journal, pp. 43 (Oct. 01, 1995).

"All I need is a miracle; computer-aided educational packages; Small Wonders," Coastal Associates Publishing L.P. (Mar. 1992).

Alonso et al., "Database System Issues in Normadic Computing," Matsushita Information Technology Laboratory, New Jersey (undated).

Badrinath et al., "Impact of Mobility on Distributed Computations," Operating Systems Review (Apr. 1, 1993).

Barbara et al., "Sleeper and Workaholics: Caching Strategies in Mobile Enviornments (Extended Version)" (Aug. 29, 1994).

Bowen, M. et al., Achieving Throughput and Functionality in a Common Architecture: The Datacycle Experiment, *IEEE*, pp. 178, 1991.

Brandel, "New offerings fuel revival of PIM," Computerworld, p. 39 (Sep. 12, 1994).

Brodersen, "InfoPad-An Experiment in System Level Design and Integration," (Mar. 01, 1997).

Demers et al., "The Bayou Architecture: Support for Data Sharing Among Mobile Users," Computer Science Laboratory, Xerox Palo Alto Research Center, California (undated).

DeVoe et al., "SOFTWARE: Day-Timer Organizer 2.0 based format of paper-based PIM," InfoWorld, vol. 17 (Aug. 21, 1995).

Froese, "File System Support for Weakly Connected Operation," pp. 229-238 (undated).

Greenberg et al., "Real Time Groupware as a Distributed System: Concurrency Control and its Effect on the Interface," Procs. Of the ACM CSCW Conf. On Computer Supported Cooperative Work, Oct. 22-26, North Carolina, ACM Press (Jan. 1, 1994).

Guy, "Ficus: A Very Large Scale Reliable Distributed File System," Technical Report CSD-910018, Computer Science Dept. UCLA (Technical Report) (Jun. 3, 1991).

Guy et al., "Implementation of the Ficus Replicated File System," appeared in Procs. Of the Summer USENIX Conf., Anaheim, CA, pp. 63-71 (Jun. 1, 1990).

Haber, "Renegade PIMS," Computerworld, p. 109 (Dec. 12, 1994).

Hammer er al., "An Approach to Resolving Semantic Heterogeneity in a Federation of Autonomous, Heterogeneous Database Systems," Computer Science Department, University of Southern California (undated).

Hammer et al., "Object Discovery and Unification in Federated Databased Systems," University of Southern California (undated).

HP and IntelliLink connect HP 95LX with HP NewWave; IntelliLink for the HP NewWave; product announcement, HP Professional (Aug. 1991).

"HP announces expanded memory version of palmtop PC, introduces 1-Megabyte HP 95LX and 1-Megabyte memory cards," Business Wire, Inc. (Mar. 4, 1992).

Houston et al., "Disconnected Operation of AFS," CITI Technical Report 93-3, Center for Information Technology Integration, University of Michigan (Jun. 18, 1993).

IBM Dictionary of Computing, Tenth Edition, 1993, pp. 268, 269, 31_.

IBM Dictionary of Computing, Tenth Edition, 1993, pp. 165, 268, 349, 370, 417.

IEEE Standard Dictionary of Electrical and Electronics Terms, Fourth Edition, 1988, p. 372, 368, 509, 563.

Imielinski, "Mobile Computing—DataMan Project Perspective," Rutgers University (undated).

"IntelliLink 2.2: the software connection from desktop to palmtop; Software Review; IntelliLink 2.2; Evaluation," PC Magazine (Apr. 28, 1992).

"IntelliLink transfers palmtop, PC data; communications software from IntelliLink Inc; brief article; Product Announcement," PC Week (Nov. 18, 1991).

Jacobs et al., "A Generalized Query-by-Example Data Manipulation Language Based on Database Logic," IEEE Transactions on Software Engineering, vol. SE-9, No. 1 (Jan. 1983).

Jenkins, "Users struggle with E-mail Woes," Computerworld, p. 97 (Oct. 24, 1994).

Johnson et al., "Hierarchical Matrix Timestamps for Scalable Update Propogation," submitted to the $10^{th}$ Int. Workshop on Distributed Algorithms (Jun. 25, 1996).

Joshi et al., "A Survey of Mobile Computing Technologies and Applications," (Oct. 29, 1995).

Kistler et al., "Disconnected Operation in the Coda File System," School of Computer Science, Carnegie Melon University, Pennsylvania (undated).

Krill, "NETWORKING: Tech Updated," InfoWorld, vol. 18 (Feb. 12, 1996).

Kumar et al., "Log-Based Directory Resolution in the Coda File System," School of Computer Science, Carnegie Melon University, Pennsylvania (undated).

Larson et al., "A Theory of Attribute Equivalence in Databases with Application to Schema Integration," IEEE Transactions on Software Engineering, vol. 15, No. 4, Apr. 1989.

Mannino et al., "Matching Techniques in Global Schema Design," IEEE 1984.

Marshall, "Product Reviews: Windows contact managers," InfoWorld, vol. 18 (Mar. 25, 1996).

McGoveran, "Distributed not yet delivered," Computerworld, p. 112 (Jun. 6, 1994).

Meckler Corporation, "Palmtop-to-desktop linkage software," Database Searcher (Jun. 1992).

Microsoft Press Computer Dictionary, Second Edition, 1994, p. 164.

Microsoft Press Computer Dictionary, Second Edition, 1994, pp. 105, 217, 227, 228.

Microsoft Press Computer Dictionary, Third Edition, 1997, pp. 194, 228, 234, 449.

Milliken, "Resource Coordination Objects: A State Distribution Mechanism," (DRAFT) (Dec. 10, 1993).

Nash, "Replication falls short," Computer world, p. 65 (Nov. 21, 1994).

Noble et al., "A Research Status Report for Adaptation for Mobile Data Access," School of Computer Science, Carnegie Melon University (undated).

"PackRat PIM gets older and wiser with Release 4.0; PIM update sports enhanced interface, greater ease of use," InfoWorld (Dec. 23, 1991).

"Palmtop PCs: power by the ounce; Hardware Review; overview of six evaluations of palm-top computers; includes related articles on Editor's Choices, suitability-to-task ratings, impressions by individual users; evaluation," PC Magazine (Jul. 1991).

"Pen-based PCs ready for prime time; includes related article on comparison of operating systems, list of vendors of pen-based products," PC-Computing (Nov. 1991).

Perera, "Synchronization Schizophrenia," Computerworld Client/Server Journal, p. 50 (Oct. 1, 1995).

Petersen et al., "Bayou: Replicated Database Services for Worldwide Applications," Computer Science Laboratory, Xerox Palo Alto Research Center, California (undated).

"Product comparison: Atari Portfolio, Casio Executive BOSS, HP 95LX, Poqet PC, Psion series 3, Sharp Wizard," InfoWorld (Dec. 16, 1991).

"Product Comparison: Personal information managers," InfoWorld, vol. 17 (Aug. 7, 1995).

Qu et al., Technical Report entitled "Mobile File Filtering," TR-CS-97-02-Australian National University (Feb. 1, 1997).

Radosevich, "Replication mania," Computerworld Client/Server Journal, p. 53 (Oct. 1, 1995).

Ratner et al., "The Ward Model: A Replication Architecture for Mobile Environments," Department of Computer Science, University of California (undated).

Reiher et al., "Peer-to-Peer Reconciliation Based Replication for Mobile Computers," UCLA (undated).

Reiher et al., "Resolving File Conflicts in the Ficus File System," Department of Computer Science, University of California (undated).

Ricciuti, "Object database server," InfoWorld, vol. 18 (Jan. 29, 1996).

"Riding the NewWave from PC to Palmtop: IntelliLink lets New-Wave users transfer files," InfoWorld (Jun. 30, 1991).

Saltor et al., "Suitability of data models as canonical models for federated databases," Universitat Politecnica de Catalunya, Spain (undated).

Satyanarayanan, "Coda: A Highly Available File System for a Distributed Workstation Environment," School of Computer Science, Carnegie Mellon University (undated).

Satyanarayanan, "Fundamental Challenges in Mobile Computing," School of Computer Science, Carnegie Mellon University (undated).

Satyanarayanan, "Mobile Information Access," IEEE Personal Communications, vol. 3, No. 1 (Feb. 1996).

Sherman, "Information Technology: 'What Software Should I Use to Organize My Life'" (undated).

Sheth et al., "A Tool for Integrating Conceptual Schemas and User Views," IEEE 1988.

Schilit et al., "The ParcTab Mobile Computing System," Xerox Palo Alto Research Center, California (undated).

SPI Database Software Technologies Record Displays: Record 2, Serial No. TDB0291.0094 and Record 4, Serial No. iets0901.0073 (undated).

Staten, "PowerMerge 2.0 ships; syncs moved filed," MacWEEK, vol. 8, p. 38(1) (Jan. 3, 1994).

Tait, Doctoral Thesis entitled "A File System for Mobile Computing," (Jan. 1, 1993).

Tolly, "Enhanced Notes 4.0 gets thumbs-up," Computerworld, p. 54 (Dec. 18, 1995).

Webster's Ninth New Collegiate Dictionary, 1986, pp. 114, 436, 440, 462, 573, 597, 620, 717, 906, 963, 979, 989, 1000, 1053, 1130, 1142, 1152, 1162, 1166.

Wiederhold, Gio, Database Design, Second Edition, McGraw-Hill Book Company, 1983, p. 2.

Wiederhold, Gio and Qian Xiaolei, Consistency Control of Replicated Data In Federal Database, *IEEE*, pp. 130-132. 1990.

Zaino, "Tapping the Top Values in PDAs—Personal digital assistants that sell for as little as $300 can put a PC in the palm of your hand. Get the scoop on 8 contenders," HomePC, pp. 97 (Oct. 1, 1996).

Zisman et al., "Towards Inoperability in Heterogeneous Database Systems," Imperial College Research Report No. DOC 95/11 (Dec. 1, 1995).

Terry et al., "Managing Update Conflicts in Bayou, a Weakly Connected Replicated Storage System," Procs, Of the Fifteenth ACM Symposium on Operating Systems Principles, pp. 172-182, Dec. 1995. ACM Press.

* cited by examiner

Pseudo Code for Translation Engine Control Module

100. INSTRUCT parameter table generator to create parameter table and initialize filter
101. INSTRUCT Synchronizer to initialize itself
102. INSTRUCT Synchronizer to LOAD the History_File into its WORKSPACE
103. INSTRUCT R_Translator to LOAD R_records from R_Database
104. INSTRUCT L_Translator to SANITIZE R_records that were just LOADED
105. INSTRUCT L_Translator to LOAD L_Records from L_Database and SEND to Synchronizer
106. INSTRUCT R_Translator to SANITIZE L_Records that were just LOADED.
107. INSTRUCT Synchronizer to do CAAR (Conflict Analysis And Resolution) on all the records in WORKSPACE.
108. INFORM user exactly what steps Synchronizer proposes to take (i.e. Adding, Changing, and Deleting records). WAIT for User.
109. IF User inputs NO, then ABORT.
110. INSTRUCT R_Translator to UNLOAD all applicable records to R_Database.
111. INSTRUCT L_Translator to UNLOAD all applicable records to L_Database.
112. INSTRUCT Synchronizer to CREATE a new History File.

FIG. 4

200. For Each record in History File
201.   Load record
202.   Store record in Workspace
203. Next record

FIG. 5

300. For each record of the database
301. Load record
302. IF Date range is being used THEN
303.   Apply Date range to the loaded record
304.   IF record within the date range THEN mark as Passed Date Range
305.   ELSE mark as Failed Date Range
306. END IF
307. Send record to synchronizer
308. In Synchronizer: Write record to Workspace
309. In Synchronizer: If record has unique ID and the unique ID matches a unique ID in the history file: If history file record has MIG, then correlate to the MIG; if the history file corresponds only to a single record of the database, link the records together in a CIG;
310. Next Record

FIG. 6

400. For each local database record in Workspace
401. If a history file is being used, then
402. If the remote database assigns unique IDs then
403.    If the record is matched to a history file record and the matched history file record has a Multiple instance list, then
404.        For each element of multiple instance list, search for a record in the remote database which has the same unique ID as that element, then use the set of matched records from the remote database to generate a model or synthetic large information expanse record
405.        Form the matched records into multiple instance list linked to the synthetic or model record and link the model or synthetic record to the history file in a CIG
407.    Else if the record matches a history file record and the matched history file record does not have a Multiple instance linked list, link the record to the matching history file record and a matching remote database record, if any, in a CIG
408.    Else (i.e. the record does not match any history file record) analyze the record as if a history file is not used for the current synchronization (steps 427-439)
410.    End if
411. Else If the remote database does NOT assign unique IDs then
412.    If the record is matched in history file and the history file record indicates that multiple records of the remote database were previously generated to store the expanse of information in the record, then
413.        Send pattern stored in the history file to the translator for the remote database
414.        In the translator: generate a number of instances based on the pattern for the record
415.        Store the generated instances in a list linked to the record
416.        Attempt to match the records of the remote database to the linked instances
417.        If a predetermined number of remote database records match the generated instances, then generate a model record based on the matched records
418.            Link the generated model record to the record being analyzed and the history file record in a CIG
420.        Else
421.            Mark the record as deleted from the remote database to be deleted from the local database
423.        End if
424.    Else (i.e. the record does not match any history file record)
425.        Analyze record as if a history file is not used for the current synchronization (steps 427-439)
426.    End if
427. Else i.e. (history file is not being used) then
428.    In the translator: determine whether the record can be stored in the remote database as a single record or multiple records need to be used
429.    If multiple records are needed, then
430.        In the translator: use all patterns appropriate for the record to generate instances
431.        Store the generated instances in lists linked to the record, keeping instances belonging to one pattern in a single list
432.        Attempt to match the records of the remote database to each linked list
433.        Select the linked list with the highest number of matches
434.        If a predetermined number of remote database records match the generated instances, then generate a model record based on the matched records
435.            Link the generated record to the record being analyzed in a CIG
440.        End if
441.    Else (i.e. item would be recorded in the remote database using a single record)
442.        Search for a record in the remote database which strongly matches the local database record, and if such a record is found, link the two records in a CIG
444. End if
445. End if
446. Repeat steps 400-446 for the remote database records, i.e. repeat the steps with the roles of the remote and local database record reversed
447. If a history file is being used, then
448.    Search in the workspace for history file records which have not been matched with any of the remote database and the local database records and which have a multiple instance list for generated remote database records or a multiple record generation pattern for generating remote (or local) database records
449.    For each such history file record found in the workspace, performing steps 402-418 to find and link to to the history file in a MIG records in the appropriate database matching the history file record
450. End if.

FIG. 7

500. For each record
501. If a record or records does not pass the current value of dynamic date range, then skip that record;
502. Else
503.   If synch action is Add or Change then
504.     Determine if the record can be stored or updated as is or to be stored by generating two or more records
505.     If to be stored or updated by generating two or more records
506.       Generate the records
507.     Store or update record or records
508.     Obtain unique ID of any new records, including the generated records, if any
509.     Send unique ID to Synchronizer
510.     In the Synchronizer: Store the unique IDs in history file; in the case of multiple generated records, store the unique IDs in a linked list attached to the history file copy of the single record
511.   Else (i.e. synch action is Delete)
512.     Delete Record
513.   End If
514. Next

FIG. 8

SYNCHRONIZING DATABASES

CROSS REFERENCE TO RELATED APPLICATIONS

This application is a continuation of U.S. application Ser. No. 10/122,704, filed Apr. 11, 2002, now U.S. Pat. No. 6,799,190 which is a continuation of U.S. application Ser. No. 09/169,199, filed Oct. 9, 1998, now issued U.S. Pat. No. 6,405,218, which is a continuation-in-part of U.S. application Ser. No. 08/752,490, filed Nov. 13, 1996, now issued U.S. Pat. No. 5,943,676. The disclosures of the prior applications are considered part of (and are incorporated by reference in) the disclosure of this application.

BACKGROUND OF THE INVENTION

This invention relates to synchronizing databases.

Databases are collections of data entries which are organized, stored, and manipulated in a manner specified by applications known as database managers (hereinafter also referred to as "Applications"; hereinafter, the term "database" also refers to a database manager combined with a database proper). The manner in which database entries are organized in a database is known as the data structure of the database. There are generally two types of database managers. First are general purpose database managers in which the user determines (usually at the outset, but subject to future revisions) what the data structure is. These Applications often have their own programming language and provide great flexibility to the user. Second are special purpose database managers that are specifically designed to create and manage a database having a preset data structure. Examples of these special purpose database managers are various scheduling, diary, and contact manager applications for desktop and handheld computers. Database managers organize the information in a database into records, with each record made up of fields. Fields and records of a database may have many different characteristics depending on the database manager's purpose and utility.

Databases can be said to be incompatible with one another when the data structure of one is not the same as the data structure of another, even though some of the content of the records is substantially the same.

Often users of incompatible databases want to be able to synchronize them with one another. For example, in the context of scheduling and contact manager Applications, a person might use one application on a desktop computer at work while another on his handheld computer or his laptop computer while away from work. It is desirable for many of these users to be able to synchronize the entries on one with entries on another. U.S. patents of the assignee hereof, Puma Technology, Inc. of San Jose, Calif. (U.S. Pat. No. 5,392,390, hereinafter, "the '390 patent", incorporated by reference herein; and U.S. Pat. No. 5,684,990, filed on Jan. 11, 1995, incorporated by reference herein) show two methods for synchronizing incompatible databases and solving some of the problems arising from incompatibility of databases.

SUMMARY OF THE INVENTION

In one aspect, the invention features a computer program and a computer implemented method for synchronizing two databases by attempting to identify a plurality of records of the second database storing a span of information stored in a record of the first database and synchronizing the first database and the second database based on the results of the attempt.

Preferred embodiments of the invention may include one or more of the following features.

To synchronize the first database and the second database, the plurality of records of the second database are processed to generate a record representative of a span of information represented by the plurality of records of the second database. The generated record is then compared to the record of the first database and synchronization action is taken based on the comparison.

The span of information represented by the record of the first database may include date-bearing information such as recurring date-bearing information or a continuous span of information. If the span of information includes recurring date-bearing information, the identified plurality of records of the second database may represent instances of a recurring date-bearing record.

The span of information may be a continuous period of time. In that case, the starting time and date and the ending time and date of the record of the first database span a period of time longer than a period permitted by the second database. Each of the identified plurality of the records of the second database stores a portion of the span is of the information, where the identified plurality of records of the second database in combination store the span of information or a selected segment thereof. The continuous period of time can be longer than a period of time permitted by the second database. The identified plurality of records of the second database may include a recurring record. Note that the record of the first database may also be a recurring record where each instance stores a span of information greater than that permitted by the second database.

Synchronizing the first database and the second database includes adding, modifying, or deleting one of the records.

The record of the first database is deleted, if the attempt to identify the plurality of records of the second database is unsuccessful.

If a plurality of records of the second database is identified as storing the span of information stored in the record of the first database, synchronizing the first database and the second database includes comparing the record of the first database to the identified plurality of records of the second database and synchronizing the identified plurality of records of the second database with the record of the first database based on the results of the comparison.

The identified plurality of records of the second database are processed to generate a span of information representative of information stored in the identified plurality of records of the second database. Then, comparing the record of the first database to the records of the second database includes comparing the span of information stored in the record of the first database to the generated span of information. In addition, a record is generated based on the identified plurality of records of the second database where the record stores the generated span of information. This generated record is then used for comparing the record of the first database to the identified plurality of the second database.

A history file stores information reflecting the records of the first and second databases at a previous synchronization. The record of the first database and the identified plurality of records of the second database are compared to the information in the history file. Synchronizing the first database and the second database then includes synchronizing based on results of the comparison to the history file.

The records of the second database can be compared to the information in the history file to identify the plurality of records of the second database based on the results of the comparison. Alternatively, the record of the first database can be compared to the records of the second database to identify the plurality of records of the second database.

Additionally, the record of the first database can be a record which was present during the previous synchronization and which was deleted from the first database prior to the current synchronization. Synchronizing the first database and the second database then includes deleting the identified plurality of records of the second database.

To identify the plurality of records of the second database, a plurality of instances are generated based on a previously determined pattern for generating a plurality of instances which in combination represent the span of information stored by the record of the first database. A second plurality of the records of the second database are then correlated to the plurality of generated instances by comparing the plurality of generated instances to the records of the second database. The second plurality of the records of the second database is then determined to be the identified plurality of records of the second database.

The previously determined pattern is selected based on a characteristic of the span of information stored in the record of the first database. Also, the plurality of generated instances are generated using the record of the first database or a corresponding history file record.

Further, at a previous synchronization, a plurality of instances of the second database is generated based on a second previously determined pattern for generating a plurality of instances which in combination represent a span of information. At the previous synchronization, information is stored in the history file reflecting the second previously determined pattern. That information is then retrieved from the history file during the current synchronization. The retrieved information determines the pattern used for generating the second plurality of records of the second database.

In some embodiments, for example, when a history file is not available, to identify a plurality of records of the second database to the record of the first database, a first plurality of instances are generated based on a first previously determined pattern for generating a plurality of instances which in combination represent the span of information stored by the record of the first database. A second plurality of the records of the second database are then correlated to the first plurality of generated instances by comparing the first plurality of generated instances to the records of the second database. A second plurality of instances are generated based on a second previously determined pattern for generating a plurality of instances which in combination represent a span of information. A third plurality of the records of the second database are correlated to the second plurality of generated instances by performing a comparison of the second plurality of generated instances to the records of the second database. The identified plurality of records of the second database are then identified based on the results of correlating the second plurality of the second database to the first plurality of generated instances and the third plurality of the second database records to the second plurality of generated instances. To do so, the number of records in the second plurality of instances of the second database is then compared to the number of records in the third plurality of instances of the second database.

In some embodiments, when the records of the second database are assigned unique identifications, a plurality of instances are generated, at a previous synchronization, based on a previously determined pattern for generating a plurality of instances which in combination represent the span of information stored by the record of the first database. At the previous synchronization, the generated records are stored in the second database. Also, at the previous synchronization, information is stored in a history file to reflect the unique identifications of the generated instances stored in the second database. In this case, to identify a plurality of records of the second database to the record of the first database further, the history file information is retrieved and correlated to unique identifications of the records of the second database. The identified records of the second database are determined to be the correlated records of the second database.

The span of information represented by the record of the first database may be textual information, where size of the textual information is larger than that permitted by the second database. The plurality of records of the second database then include textual information, the textual information of the plurality of records of the second database in combination represent the textual information represented by the record of the first database.

In another aspect, the invention features a computer program and a computer implemented method for storing a record of a first database in a second database where the record of the first database stores a span of information and the second database is not capable of storing such span of information in a single record. A plurality of records of the second database are generated to store the span of information of the record of the first database, each of the plurality of the records of the second database storing a portion of the span of the information, where the plurality of records of the second database in combination store a selected segment of the span of information less than the entirety of the span of information.

Preferred embodiments of the invention may include one or more of the following features.

The selected segment is a selected date range narrower than the date range of the second database. The selected date range is determined relative to a selected date by applying a rule. The rule can be a preference for future dates compared to a current date over past dates compared to the current date, a preference for dates closer to a current date over dates further from the current date, and a limit on a total number of generated records.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

BRIEF DESCRIPTION OF THE DRAWING

FIG. 4 is the pseudocode for a Translation Engine Control Module of the synchronization program of FIG. 2.

FIG. 5 is the pseudocode for loading a history file.

FIG. 6 is the pseudocode for the steps taken by a translator to load records of a database.

FIG. 7 is the pseudocode for the steps taken by the synchronizer module of the synchronization program of FIG. 2 for correlating records of the local database, the remote database, and the history file to one another.

FIG. 8 is the pseudocode for the steps taken by a translator to unload records to a database.

DESCRIPTION

Figure 1:
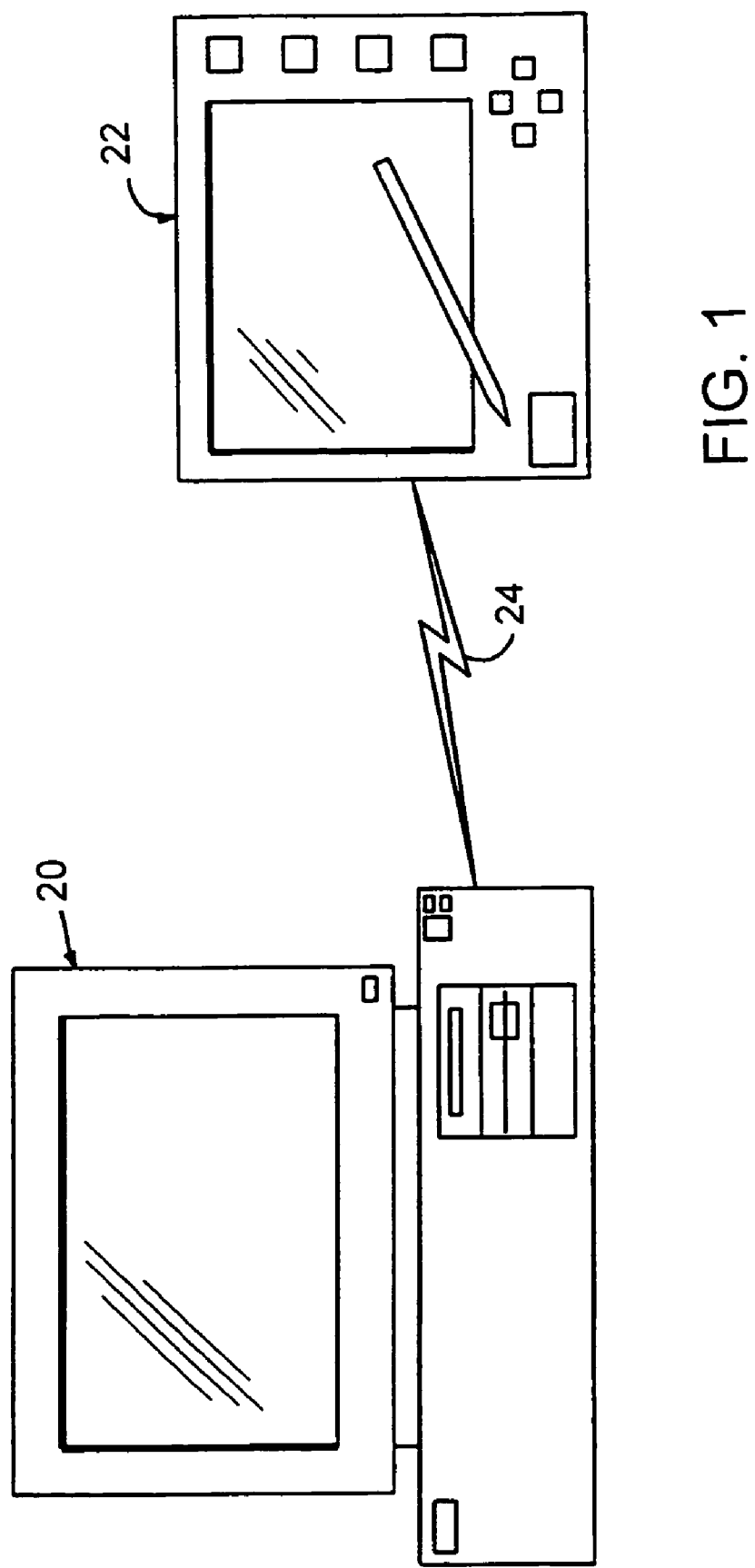
FIG. 1 shows two computers connected via a data transfer link.

We will describe embodiments of the invention in detail below, but briefly, referring to FIGS. 1 and 2, a synchronization program 100 runs on a local computer 20 (e.g. a desktop or server computer) which is typically connected to a remote computer 22 (e.g. a handheld or notebook computer) via a data transfer link 24 enabling the computers to transfer data between them. Data transfer link 24 may be a serial infrared link, serial cable, modem and telephone line combination, or other such data transfer links. Each of the local and remote computers stores a corresponding local or remote database, which may, for example, be a scheduling database (such as those sold under the tradenames Microsoft Schedule+ and Lotus Organizer).

Synchronization program 100 synchronizes the records of the local and remote databases typically using a history file that contains records reflecting the records of the two databases at the end of a previous synchronization. The synchronization program 100 uses the history file to determine, for example, which records have been changed, added or deleted since the previous synchronization and which records of the two databases correspond to one another.

As part of the synchronization process, synchronization program 100 can synchronize a local or remote database record which has a span or expanse of information not permitted by the other database. The local or remote database record may be a date bearing record spanning a continuous period of time (e.g. from 8:00 a.m. on Monday to 5 p.m. on Friday) larger than is permitted in a corresponding record of the other database. Such record may also be a date bearing recurring record (e.g. a record representing a recurring appointment or event) having a recurrence pattern not permitted by the other database. For example, the local or remote database record may have a recurrence pattern of "every other week" where such a pattern is not permitted in the other database.

In synchronizing such records, synchronization program uses multiple records of the other database to store or reflect the span of information represented by such records. Each of the multiple records of the other database then would store a portion of the span of information and, taken together, the plurality of records store the entire or at least a useful portion of the span of information stored in the remote or database record.

We will now describe in detail the structure of synchronization program 100 and the method it uses to synchronize the local and remote databases where at least one of them includes a record which stores a span of information which can not be stored in a single record of the other database.

Figure 2:
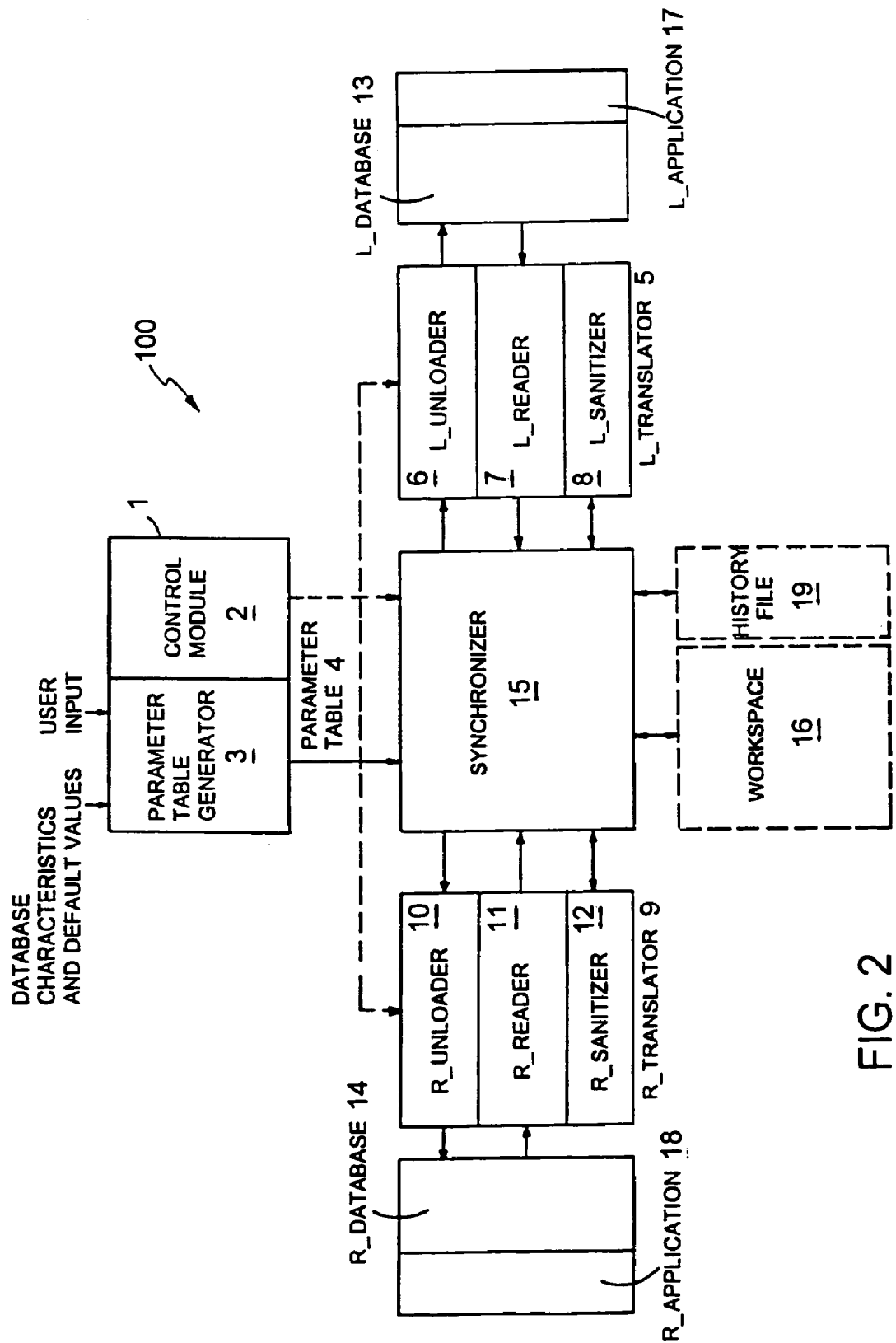
FIG. 2 is a schematic drawing of the various modules constituting an embodiment of a synchronization program.

FIG. 2 shows the relationship between various modules of an embodiment of synchronization program 100. Synchronization program 100 includes a Translation Engine 1. Translation Engine 1 comprises a Control Module 2 and a Parameter Table Generator 3. Control Module 2 is responsible for controlling the synchronizing process by instructing various modules to perform specific tasks on the records of the two databases being synchronized. (FIG. 4 is the pseudocode for the steps taken by this module.)

Parameter Table Generator 3 is responsible for creating a Parameter_Table 4 which is used by all other modules for synchronizing the databases. Generally, Parameter_Table 4 stores various information which may be used by the modules of synchronization program 100. The information stored in Parameter Table 4 includes user preferences, the names and locations of the databases, and the names and locations of various files stored on disk including the name and location of the history file from a previous synchronization.

Figure 3:
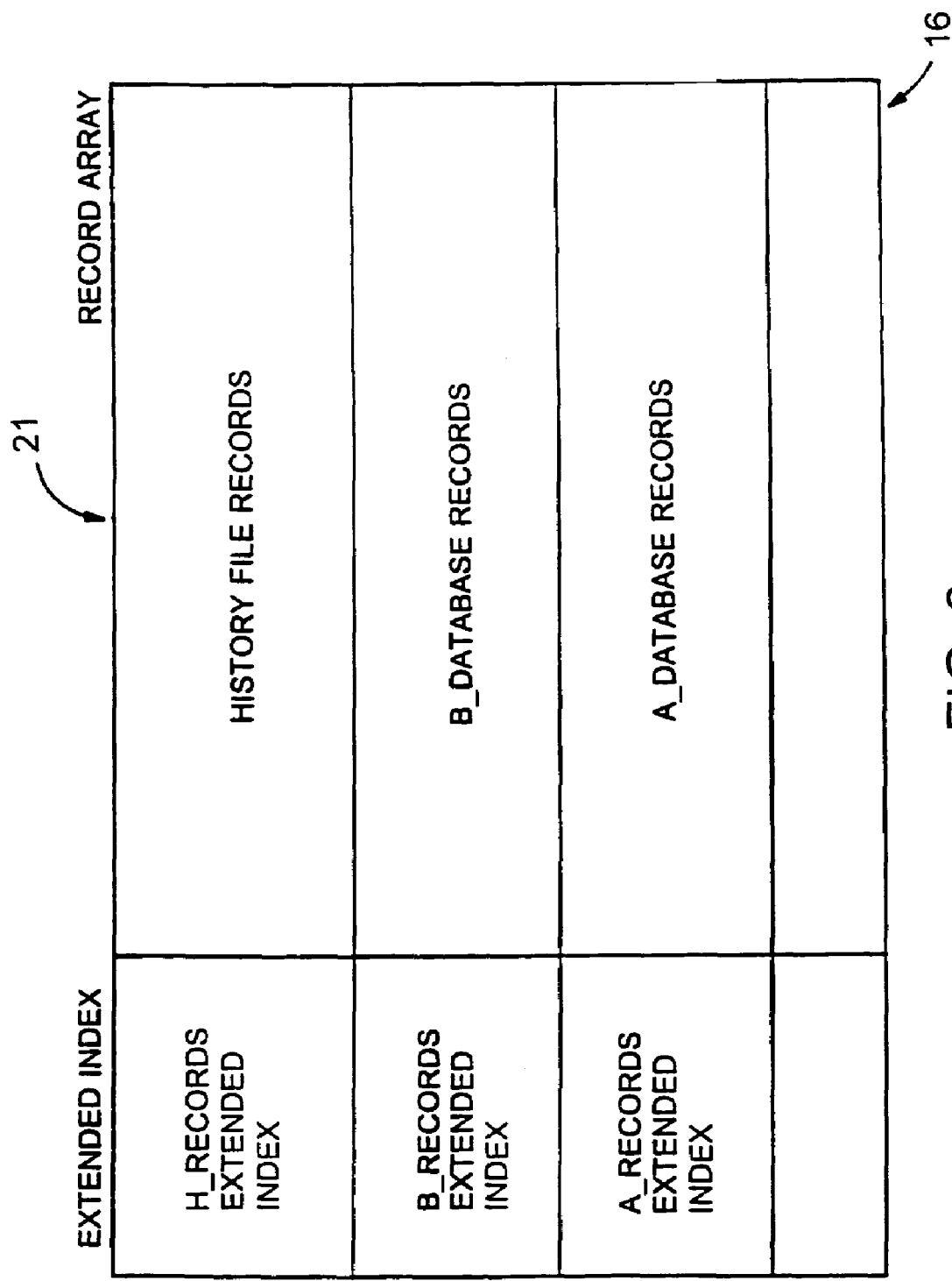
FIG. 3 is a representation of a workspace data array used by the synchronization program of FIG. 2.

A synchronizer 15 has the primary responsibility for carrying out the core synchronizing functions. It is a table-driven program which is capable of synchronizing various types of databases whose characteristics are provided in Parameter_Table 4. Synchronizer 15 creates and uses workspace 16 (also shown in FIG. 3), which is a temporary data array used during the synchronization process.

Synchronization program 100 has two translator modules 5 and 9 which are generally responsible for data communication between synchronization program 100 and databases 13 and 14. Translator (L_translator) 5 is assigned to the local database (L_database) 13 and translator 9 (R_translator) to the remote database (R_database) 14. Each of the database translators 5 and 9 comprises three modules: reader modules 6 and 10 (L_reader and R_reader) which load (or read) records from databases 13 and 14; unloader modules 8 and 12 (L_unloader and R_unloader) which analyze and unload records from workspace 16 into databases 13 and 14; and sanitizing modules 7 and 11 (L_sanitizer and R_sanitizer) which analyze the records of the opposing database when they are loaded into the workspace and modify them according to rules of data value of the modules's own database. Briefly stated, rules of data value are generally rules that define the permitted content of the fields of the records of a database. An example of such a rule would be that no more than 100 characters may be present in a field, or that content of a field designating a priority for a "to do" item should be limited to 1, 2, or 3. Sanitizing a record is to change the content of the fields of a record of one database to conform to the rules of data value of another database. Rules of data value and sanitization are described in detail in the following commonly owned U.S. patent applications, incorporated in their entirety by reference, "Synchronization of Recurring Records in Incompatible Databases", Ser. No. 08/752,490, filed on Nov. 13, 1996 (hereinafter, "application '490"); "Synchronization of Databases with Record Sanitizing and Intelligent Comparison," Ser. No. 08/749,926, filed Nov. 13, 1996 (hereinafter, "application '926"); "Synchronization of Databases with Date Range," Ser. No. 08/748,645, filed Nov. 13, 1996 (hereinafter, "application '645").

In the described embodiment, the modules of L_translator 5 are designed specifically for interacting with local database 13 and local application 17. The design of the modules of L_translator 5 is specifically based on the record and field structures and the rules of data value imposed on them by the local application, the Application Program Interface (API) requirements and limitations of local application 17 and other characteristics of the local database and application. The same is true of the modules of R_translator 9. These translators are typically not able to interact with other databases or Applications and are only aware of the characteristics of the database and application for which they are designed. Therefore, when the user chooses two applications for synchronization, Translation Engine 1 chooses the two translators which are able to interact with those applications. In an alternate embodiment, the translators can be designed as table-driven programs, where a general translator is able to interact with a variety of applications and databases based on supplied parameters.

Generally, a translator is designed, among other functions and capabilities, for determining whether a span of information can be stored in a single record of its associated database or whether multiple records must be generated to store the information. Additionally, a translator is designed to generate multiple records to store the span of information to be stored. A translator generates such multiple records using predetermined patterns for generating multiple records. What pattern is used generally depends on the nature of the span of information and the limitations of the database.

We will now describe an example of patterns used for generating multiple records to store a span of information. One exemplary pattern is to generate multiple records, each storing information with respect to one instance of a recurring record. The patterns used to generate such instances and records will be referred to as fanning patterns and the process of generating instances and records according to this pattern will be referred to as fanning. Instances and records generated using a fanning pattern will be referred to as fanned instances and records.

Another exemplary pattern is to generate multiple records each of which stores information with respect to one of a number of instances, where the instances in combination span a continuous period of time represented by a single record of the other database. For example, in the case of an appointment which spans from Monday at 8 a.m. to Friday at 5 p.m., multiple daily records may be generated to cover or tile over this span, such as Monday 8 a.m. to 11:59 p.m., Tuesday 12 a.m. to 11:59 p.m., Wednesday 12 a.m. to 11:59 p.m., Thursday 12 a.m. to 11:59 p.m., and Friday 12 a.m. to 5 p.m. Such a record can also be based on the following pattern: Monday 8 a.m. to 11:59 p.m., 3-day Daily repeat 12 a.m. to 11:59 p.m. covering Tuesday through Thursday, and Friday 12 a.m. to 5 p.m. The patterns used to generate such instances and records will be referred to as tiling patterns and the process of generating instances and records according to this pattern will be referred to as tiling. Instances and records generated using a tiling pattern will be referred to as tiled instances and records.

Translators can also use combinations of fanning and tiling patterns to generate multiple records. Table 1 shows various examples of patterns which may be used.

| Record to be stored | Pattern for generating multiple instances or records | Generated instances or records |
| --- | --- | --- |
| Lunch with X Every 15th - 12 p.m.-1 p.m. | FAN | Apr. 15, 1998 at 12 p.m.-1 p.m.; May 15, 1998 at 12 p.m.-1 p.m.; Jun. 15, 1998 at 12 p.m.-1 p.m.; etc. |
| Conference from 9 am Monday through 5 pm Friday (nonrecurring) | TILE DAY BY DAY: Tile with nonrecurring instances | Monday 9 am-11:59 pm; Tuesday 12 am-11:59 pm; Wednesday 12 am-11:59 pm; Thursday 12 am-11:59 pm; Friday 12 am-5 pm |
| Conference from 9 am Monday through 5 pm Friday (nonrecurring) | TILE WITH DAILY REPEAT: Tile with recurring records | Monday 9 am-11:59 pm; DAILY item 12 am-11:59 pm Tuesday through Thursday; Friday 12 am-5 pm |
| Quarterly accounting marathons (recurring) | CROSS-SECTIONAL TILING: Each Tile here is a recurring item | Quarterly, on the last Wednesday of each quarter, from 9 am to 11:59 pm; Quarterly, on the last Thursday of each quarter, from 12 am to 11:59 pm; Quarterly, on the last Friday of each quarter, from 12 am to 9 pm |
| Yearly Plant Shut Down, every year, starting 3 pm, Dec. 24th through 9 am Jan. 2nd. | FAN AND TILE WITH DAILY REPEAT: fan the master item into a set of instances, then TILE each instance, allowing DAILY RECURRING TILES to result. | Dec. 24, 1999, 3 pm-11:59 pm; Daily Repeat, Dec. 25, 1999-Jan. 1, 2000, 12 am-11:59 pm; Jan. 2, 2000, 12 am-9 am; Dec. 24, 2000, 3 pm-11:59 pm; Daily Repeat, Dec. 25, 2000-Jan. 1, 2001, 12 am-11:59 pm; Jan. 2, 2001, 12 am-9 am . . . |
| Quarterly accounting marathons (recurring) | FAN AND TILE DAY BY DAY: fan the master item into a set of instances which are then TILED into N non-recurring tiled instances. | Wednesday, Mar. 29, 1998, 9 am-11:59 pm; Thursday, Mar. 30, 1998, 12 am-11:59 pm; Friday, Mar. 31, 1998, 12 am-9 pm; Wednesday, Jun. 28, 1998, 9 am-11:59 pm; Thursday, Jun. 29, 1998, 12 am-11:59 pm; Friday, Jun. 30, 1998, 12 am-9 pm; Wednesday, Sep. 28, 1998, 9 am-11:59 pm; Thursday, Sep. 29, 1998, 12 am-11:59 pm; Friday, Sep. 30, 1998, 12 am-9 pm; Wednesday, Dec. 29, 1998, 9 am-11:59 pm; Thursday, Dec. 30, 1998, 12 am-11:59 pm; Friday, Dec. 31, 1998, 12 am-9 pm; Wednesday, Mar. 29, 1999, 9 am-11:59 pm; Thursday, Mar. 30, 1999, 12 am-11:59 pm; Friday, Mar. 31, 1999, 12 am-9 pm; . . . and so forth, up to the max fanning*tiling count . . . |

Referring back to FIG. 1, having described the structure of synchronization program 100 in reference to its various modules, we will now describe the operation of synchronization program 100. During synchronizing two database, Control Module 2 instructs the various modules in synchronization program 100 to perform specific tasks. In this manner, Control Module 2 controls the operation of various modules of synchronization program 100. Hence, we will describe the operation of synchronization program 100 by describing the steps taken by Control Module 2 (as set out in the pseudo code in FIG. 4) and describing in detail the actions by the various modules of synchronization program 100 as they are instructed by Control Module 2.

Referring to FIG. 4, in the first step of synchronizing the two databases, Control Module 2 instructs the Parameter Table Generator 3 to create parameter table 4 (Step 100). In this step, as part of creating parameter table 4, Parameter Table Generator 3 obtains from the user various parameters governing user preferences to be used during synchronization or alternatively accesses a previously stored set of user preferences. One of these user preferences can be a date range which is then used to limit synchronization to that date range. There are two types of date ranges which the user can select. One type of date range is a static date range which remains the same from one synchronization to the next. An example of a static date range is one being from Jan. 1, 1998 to Dec. 31, 1998. Another type of date range is a dynamic date range which is typically anchored to a preselected reference date and changes as that reference date changes. An example of dynamic date ranges is one being from the beginning to the end of the current quarter. Another is one from a month before today to a month after. Date ranges and synchronization of databases using date ranges are described in detail in the '490, '926, and '645 applications and U.S. patent application "Synchronization Of Databases Using Filters", Ser. No. 09/036,400, filed on Mar. 5, 1998, incorporated by reference in its entirety.

After Parameter Table Generator 3 creates the parameter table 4, Control Module 2 of the Translation Engine 1 instructs synchronizer 15 to initialize itself (step 101). Synchronizer 15 in response creates the workspace data array 16. Control Module 2 of the Translation Engine 1 then instructs synchronizer 15 to load history file 19 into workspace 16 (step 102). History file 19 is a file that was saved at the end of last synchronization and contains records reflecting the records of the two databases at the end of the previous synchronization. Synchronizer 15 uses history file 19 during current synchronization to analyze the records of the local and remote database to determine changes, additions, and deletions in each of two databases since the previous synchronization. Synchronizer 15, as result of this analysis, then can determine what additions, deletions, or updates need be made to synchronize the records of the two databases.

In various situations, synchronizer 15 does not load history file 19. For example, if no history file from a previous synchronization exists or if the user chooses to synchronize not using the history file, synchronizer 15 will not load history file 19. Obviously, in the case where a history file is not loaded, synchronizer 15 synchronizes the two databases without using a history file.

FIG. 5 is the pseudocode for the steps taken by synchronizer 15 to load history file 19. For each Record in history file 19 (step 200), synchronizer 15 first loads the record (step 201) and then writes the loaded record into workspace 16 (step 202). Synchronizer 15 repeats these steps until all of the records of the history file are loaded into the workspace.

Referring back to FIG. 4, after the history file is loaded into the workspace, Control Module 2 instructs R_translator 13 to load the remote database records (step 103). FIG. 6 is the pseudocode for the steps taken by R_translator 13 to load the remote database records. For each record of the remote database (step 301), R_reader module 11 of the R_translator first loads the record (step 302). If a date range is being used, then R_reader module 11 applies the current date range to the loaded record (step 303). This step can also be performed by synchronizer 15. If the record passes (i.e., falls within) the date range then R_reader module 11 marks the record as having passed the date range (step 304). If the record does not pass the date range then R_reader module 11 marks the record as having failed the date range (step 305). R_reader module 11 then sends the record to synchronizer 15 (step 307) and synchronizer 15 writes the loaded record into workspace 16 (step 308).

At this point, if the record has a unique identification code (hereinafter, also referred to as "unique ID") which was assigned by the remote database, the unique ID is compared to unique IDs, if any, stored in the history file records. A history file record may store either a unique ID of a single record of the remote database or a linked list of unique IDs (together with the content) of multiple records of the remote database. We will refer to the linked list as multiple instance group (MIG). The multiple records of the remote database associated with a MIG are remote database records which were previously generated (by being fanned or tiled) to store contents of a local database record. If the unique ID of the remote database record matches a stored unique ID in a MIG, the remote database record is then correlated to the matching instance in the MIG. If the unique ID of the remote database record matches unique ID stored in a history file record which corresponds to a single remote database record, then, in step 309, the remote database record is linked to the matching history file record in a corresponding item group (CIG), which will be described below.

Generally, as one of the steps in synchronizing the databases, synchronizer 15 processes the records of the databases, including comparing them to one another, in order to form them into groups of related records called corresponding item groups (CIGs). Each CIG may include at most one record from each of the databases and the history file. Each record in a CIG may be a single record or a group of related records (that is, a MIG) which together store a span of information which can be stored in a single record of the other database. In the case of such related records, based on the records, synchronizer 15 creates a model or synthetic single record which would store the span of information represented by those related records. Synchronizer 15 uses the model record during the synchronization process to represent the group of related records. Therefore, instead of comparing the entire group to another record, synchronizer 15 compares the model record to the other record and thereby increases the efficiency of any such comparison and the overall synchronization process. Synchronizer 15 includes the model recurring record in the CIG. Hereinafter, when referring to a "record" in a CIG, we also refer to such a group of related records in the CIG.

Following loading the remote database records, Control Module 2 instructs L_sanitizer module 8 of L_translator 5 to sanitize the remote database records in the workspace (step 104).

Control Module 2 of the Translation Engine 1 then instructs the L_translator 5 to load the records from the local database (step 105). L_translator 5 and synchronizer 15 load records of the local database in the same manner as described for R_translator 9 in reference to FIG. 6, except for one difference. As synchronizer 15 receives each local database record from the L_reader module 7 of the L_translator 5, synchronizer 15 maps that record using a local database to remote database map before writing the record into the next available spot in workspace 16. In the described embodiment, the local database records are mapped because the records in the workspace are stored according to the remote database data structure.

Referring back to FIG. 4, after all records from the remote local database records, and the history file, are loaded into the workspace, Control Module 2 instructs synchronizer 15 to perform a Conflict Analysis and Resolution ("CAAR") procedure on the records in the workspace (step 107), CAAR procedure is described in detail in the '490, '926 and '645 applications. Briefly, referring to FIG. 7, synchronizer 15 processes the records in the workspace, including comparing them to one another, in order to form them into corresponding item groups (CIGs). As noted above, synchronizer 15 begins forming CIGs as records are loaded into the workspace and completes the process as the first step in CAAR.

We will now describe in detail the CAAR procedure as it applies to synchronizing records which cannot be stored in the other database using single records and for which multiple records must be generated or were already generated during a previous synchronization.

Generally, the type of processing in CAAR depends on whether a history file is being used. If a history file is being used, synchronizer 15 is able to use two types of information stored in the history file. First, if one or both databases assign unique IDs to the records, the unique IDS from the previous synchronization would be stored in the history file. Synchronizer 15 can then use these stored unique IDs to match the records of the two databases and the history file records. Second, if a pattern was used to generate multiple records of one database to store a span of information of a single record of the other database, that pattern would be stored in history file with a corresponding history file record. Synchronizer 15 can use that pattern for matching the records of the two databases and the history file records.

Referring to FIG. 7, to process a local database record in CAAR, synchronizer 15 first determines whether a history file is being used during the current synchronization (step 401). If so, synchronizer 15 determines whether the remote database assign unique IDs (step 402). If so, synchronizer 15 attempts to match the record to a history record by the unique IDs assigned by the remote database. If synchronizer 15 matches the record to a history file record and the history file record has a MIG (step 403), synchronizer 15 uses the records which have been matched to members of the MIG to generate a model record storing the span of information stored in the records in the linked list (step 404). Synchronizer 15 then links the generated model record to the history file record and the local database record in a CIG.

If the local database record matches a history file record which does not have a MIG, then synchronizer 15 links, in a CIG, the local database record to the history file record and a matching remote database record, if any (step 407). If synchronizer 15 does not match the record to a history file record (step 408) then synchronizer 15 processes the local database record as in the case where a history file is not used during synchronization (steps 427-439), which will be described in detail below.

If a history file is not used or if the remote database does not assign unique IDs, then synchronizer 15 must use other means to determine whether multiple records of the remote database store the span of information stored in the local database record and also identify those records.

If a history file is being used but the remote database does not assign unique IDs, then synchronizer 15 determines whether the local database record being processed matches a history file record and the matched history file record indicates that multiple remote database records were generated during a previous synchronization to store a span of information stored in a local database record (step 412). In that case, the matching history file record stores information identifying the pattern used to generate the multiple remote database records during the previous synchronization. Synchronizer 15 retrieves that pattern and sends it to the remote database translator (step 413). The translator uses the pattern to generate multiple instances based on the history file record (step 414). In other embodiments, synchronizer 15 uses the local database record for generating the instances. These generated records are placed in a linked list attached to the local database record or the history file record (step 415).

Synchronizer 15 then attempts to match records of the remote database to the generated records (step 416). Synchronizer 15 uses a matching technique which uses two levels of match between records. A first level match between two records, or a strong match, is one where all synchronized fields match. A second level match, or a weak match, is one where only some preselected fields (e.g. the keyfields) of the synchronized fields match. Synchronizer 15 attempts to find strong matches for all the instances in the linked list. Failing that, synchronizer 15 matches records using the second level match. The second level match essentially allows matching records which may have been modified in some respect but should nonetheless be recognized as a generated instance corresponding to the local database record.

After attempting to match remote database records to the generated instances (step 416), synchronizer 15 determines whether a predetermined number of remote database records have matched the generated instances and, if so, generates a model record based on the matched remote database records (step 417). Synchronizer 15 then links, in a CIG, the matching local database record to the history file record and the model record (step 418).

If a predetermined number of remote database records did not match the generated instances (step 420), then the local database record is marked as having been deleted from the remote database and therefore will be deleted from the local database (step 421). The generated instances are discarded since insufficient number of remote database records were matched against them. The remote database records which were matched against the generated instances remain in the workspace and continue to be processed like the other remote database records in the workspace. Unless subsequently linked to other records, these remote database records would be marked as records to be added to the local database in step 449, which will be described in detail below.

If the local database record does not match a record of the history file (steps 412 and 424), synchronizer 15 processes the local database record as in the case where a history file is not used during synchronization (step 425), which we will now describe is detail.

If a history file is not used for the current synchronization (step 427), unlike the above procedure, the pattern previously used can not be determined. Therefore, in that case, all possible patterns which may have previously used by the translator are used to generate instances. Synchronizer 15 then attempts to determine which pattern best fits the remote database records and generates a model or synthetic record based on the records matching the pattern.

Hence, in step 428, the translator determines whether the local database record can be stored as a single remote database record or whether multiple remote database records must be used to store the local database record. If multiple records must be used (step 429), then synchronizer 15 must determine whether multiple remote database records store the span of information in the local database record being processed. To do so, synchronizer 15 requests the remote database translator to generate all patterns of records which might be appropriate for storing the local database record in the remote database (step 430). Synchronizer 15 then stores each set of generated instances in a unique linked list (step 431). Synchronizer 15 then attempts to match remote database records to the instances in the linked lists (step 432). Synchronizer 15 then selects the linked list having the highest number of matches as the one most likely having the remote database records corresponding to the local database record (step 433). In other words, the pattern for generating that linked list is identified as representing the pattern which was previously used to generate the multiple instances of the local database record.

Synchronizer 15 next determines whether a predetermined number of remote database records have matched the generated instances. For example, synchronizer 15 may make such a determination if at least one third of the generated instances are matched. If so, synchronizer 15 generates a model or synthetic record based on the matched remote database records (step 434). Synchronizer 15 then links the local database record and the generated record in a CIG (step 435). If a predetermined number of remote database records did not match the generated instances (step 434), then the local and remote database records are not linked to one another at this point.

If synchronizer 15 determines that the local database record can be stored in a single record (steps 428, 441), then synchronizer 15 searches the workspace for a remote database record which strongly matches (i.e. a first level match) the local database record and if such a record is found, links the local database record to the remote database record (step 442).

Synchronizer 15 then processes unmatched remote database records in a similar manner as local database records, as described above in reference to steps 400-445 (step 446).

At this point, synchronizer 15 then attempts to determine what action to be taken for records which have been deleted since the previous synchronization, where the records were previously stored in the other database by generating multiple records of the other database. For such records, a history file record with an associated MIG or record generation pattern exits in the history file. Synchronizer 15 first searches the workspace for such history file records (step 448). Then, for each such record, synchronizer 15 attempts to match the instances in the MIG or generated using the stored pattern with records of the corresponding database, as indicated by the history file record (step 449). To find the appropriate matches, synchronizer 15 performs processing steps similar to those in steps 402-418, described above in detail. Therefore, if for example the history file record indicates that the local database record was stored by generating multiple remote database record, then synchronizer 15 attempts to match the history file record to the appropriate remote database records. These remote database records will eventually be deleted. Note that at this point, any remote or local database record not linked to any other record will eventually be added to the other database as a new record.

For each CIG synchronizer 15 then compares the records in the CIG to one another, determines their differences, and decides what synchronization action should be taken. In essence, synchronizer 15 determines which record in the CIG contains the most current data. Synchronizer 15 then determine what synchronization action should be taken to conform the other records in the CIG to the record with the most current data (i.e. how the other records in the CIG should be changed). Synchronization actions with respect to a record include updating, deleting, adding, or not modifying that record.

We will now provide some examples of the results obtained in the CAAR analysis. If after comparing the records in a CIG, synchronizer 15 determines that the record from the local database is unchanged and the one from remote database is changed, synchronizer 15 determines that the local database record should be changed to conform to the remote database record. Or, if both records are changed (an example of what we refer to as a "conflict" since there is no clear choice of synchronization action), synchronizer 15 may use a user-selected rule to decide what synchronization should be taken. The rule may require, for example, not modifying either of the records, changing the remote database record to conform to the local database record, or asking the user to resolve the conflict.

Where multiple records of a database are required to store a record and the CIG contains multiple records of that database, synchronizer 15 examines the records in the linked list to determine whether some of the records pass the value of the dynamic date range associated with a previous synchronization but fail the current value of the date range. If so, then the dynamic date range has changed in such a way that part of the set of related records fall outside of the current value of the dynamic date range. In the described embodiment, in such a situation, synchronizer 15 determines that new records should be generated and previously generated records should be deleted. To accomplish this, synchronizer 15 flags the appropriate record. The appropriate translator in response generates the appropriate database records and deletes the previous instances.

When synchronizer 15 finishes performing CAAR on the records, synchronizer 15 will have determined what synchronization action should be taken with respect to all records to be synchronized. The records may then be unloaded into their respective databases. The translators will perform the specific synchronization actions to be taken with respect to the records of the databases. However, prior to doing so, the user is asked to confirm proceeding with unloading (FIG. 4, steps 108-109). Up to this point, neither the databases nor the history file have been modified. The user may obtain through the Translation Engine's User Interface various information regarding what synchronization actions are to be taken upon unloading.

If the user chooses to proceed with synchronization and to unload, the records are then unloaded. Unloader modules 6,10 of translators 5,9 perform the unloading for the databases. During unloading, translators may use the date range to limit the data that is unloaded to the databases. For example, the translators may unload only those records which fall within the date range and delete any record which falls outside of the date range. During unloading, synchronizer 15 also creates the history file and unloads information representative of the records of the databases into the history file. We will now describe the unloading of the records into the databases and the history file in detail.

Control Module 2 of Translation Engine 1 first instructs R_translator 9 to unload remote database records from workspace into the remote database (FIG. 4, step 110). FIG. 8 is the pseudocode for the steps taken by R_translator 9 to unload the records. For each remote database record in the workspace (step 500), R_translator 9 determines whether a dynamic date range is being used during synchronization. If a dynamic date range is being used, then R_translator 9 first determines whether the record to be unloaded passes or fails the date range. Note that a record is considered to pass a date range if a portion of the span of time represented by the record or an instance of a recurring record passes the date range.

If the record does not pass the current date range (step 501) then the record is skipped. In some embodiments, instead of being skipped, such a record may be deleted from the remote database. In other database, such a record may be synchronized in a particular manner depending on the nature of the synchronization action to be taken; for example, the record may be updated but not added or deleted, or the record may updated and added, but not deleted. In embodiments where records which fail the date range are deleted, R_translator 9 uses the date range to limit the size of the remote database. If the remote database is located on a handheld computer, R_translator manages the memory of the handheld device by limiting the size of the database stored on the handheld computer.

If the record passes the current date range (step 502), then R_translator 9 adds, deletes, or updates the record according to results of synchronization obtained during CAAR analysis. To do so, R_translator first determines what action is to be taken. If the record is to be added or updated (step 503), R_translator first determines whether multiple records should be generated to store or update the span of information stored by the record to be added (step 504). If multiple records should be generated (step 505), R_translator 9 uses a predetermined pattern, such as the ones described above, to generate the records (step 506). Note that the number of generated records may be limited, for example, because of limitations on memory storage. Such limitations may be based on a predetermined rule or a set of rules defining a useful number or range of records. For example, a set of rules may provide for preferring future records to past records, for preferring dates closer to the current date over dates further away, for limiting the number of generated records to a predetermined value, and for limiting the generated record to those falling within the current dynamic or static date range. Therefore, in some circumstances, for example, R_translator can generate a number of future records to be added to the remote. If future records cannot be added because they fall out of the current date range, synchronizer 15 can then generate past records and add them until the limit on the number of records is reached. (Note that the operation of R_translator with respect to recurring records in this regard is described in more detail in the '490, '926 and '645 applications. The teachings of those applications, in this regard at least, can also be applied to single records which represent continuous periods of time which can not be represented by a single record of the other database.)

The record or the generated records are then stored or updated, as appropriate (step 507). R-translator 9 then obtains the unique ID of any new records added to the remote database (step 508) and sends the unique ID to synchronizer 15 (step 509). Synchronizer 15 in turn stores the unique IDs in the history file (step 510). In the case of generated records, synchronizer 15 stores the unique IDs in a linked list attached to the history file copy of the single record for which records had to be generated.

Following unloading the remote database records, Control Module 2 instructs the L_translator 5 to unload the local database records from the workspace in a similar fashion as R_translator 9 (FIG. 4, step 111).

Control Module 2 next instructs synchronizer 15 to create a new history file (step 112, FIG. 4). The process of creating a history file is described in detail in the '490, '926 and '645 applications. Briefly, for each CIG, synchronizer 15 during the CAAR process determines which one of the records in the CIG should be saved as the history file record. Based on these results, synchronizer 15 creates a history file. Synchronizer 15 also stores with appropriate history file records the pattern, if any, used to generate records for storing the span of information stored by the record and unique IDS, if any, of such generated record.

Other embodiments are within the scope of the following claims.

For example, as described in reference to FIG. 7, when a history file is not used for the current synchronization, the pattern which was used previously to generate records of a database is not available. I described, in reference to FIG. 7, one technique of matching remote database records to a record of the local database which stores a span of information not storable in a single record of the remote database. In that technique, (see FIG. 7, steps 427-445) synchronizer 15 attempts to match up the records of the remote database to all possible patterns the remote database translator would use to generate records for the local database record. Synchronizer then determines which one best fits. In an alternative embodiment, instead of attempting to match against all possible patterns, the remote database translator selects a pattern which the translator would have chosen to generate records of the database to store the span of information in the local database, if the local database record was to be added to the remote database. This pattern is then used in the same manner as described above in reference to steps 412-423 in FIG. 7. In other words, the pattern is used by the translator to generate a number of instances and synchronizer 15 attempts to match records of the database to the generated instances, generates a model record if enough number of matches are found, and synchronizes the local database record with the model record (and, hence, the remote database records). By processing the records using a single pattern, the processing time required for synchronization is thus reduced.

In some embodiments, the span information represented by a record may be textual information. Consider the case where local database permits storing a 500 character field in a single record while the remote database permits storing a 100 character field in a record. In that case, multiple remote database records are generated to store the 500 character field.

Although we have generally described embodiments as generating multiple records, it should be understood that the term "generating multiple records" also encompasses embodiments in which multiple fields within single records are generated. This would be the case, for example, where a database allows a dynamic or self-defined record structure.

It is to be understood that while the invention has been described in conjunction with the detailed description thereof, the foregoing description is intended to illustrate and not limit the scope of the invention, which is defined by the scope of the appended claims. Other aspects,

What is claimed is:

1. A computer program product for synchronizing at least a first and a second database, the computer program product comprising at least one computer-readable storage medium having computer readable program code portions encoded therein, the computer-readable program code portions comprising instructions which when executed configure a computer to:

identifying a plurality of records of the second database storing a span of information stored in a record of the first database, the span of information being represented by the record of the first database including date-bearing information that includes recurring date-bearing information, the span of information having a starting time and date and an ending time and date which span a continuous period of time that is longer than a period of time permitted by the second database;
synchronizing the first database and the second database based on the results of the identifying; and
identifying the plurality of records of the second database as storing the span of information stored in the record of the first database, each of the identified plurality of records of the second database storing a portion of the span of the information, the identified plurality of records of the second database in combination storing a selected segment of the span of information, and
the identified plurality of records of the second database including instances of a recurring date-bearing record.

* * * * *